April 5, 1938.  C. BEAN  2,113,439
DENTAL DEVICE
Filed Aug. 4, 1936

INVENTOR
Clinton Bean

Patented Apr. 5, 1938

2,113,439

UNITED STATES PATENT OFFICE 2,113,439

DENTAL DEVICE

Clinton Bean, New Rochelle, N. Y.

Application August 4, 1936, Serial No. 94,134

4 Claims. (Cl. 132—92)

This invention relates to dental devices and has particular relation to a combined toothbrush and dental floss applicator.

It has been found that brushing the teeth with the usual type of toothbrush removes the food particles on the top and on the surface of the teeth but does not ordinarily dislodge the particles between the teeth. To prevent fermentation of the food particles in the confined area between the teeth and the resultant decay and dental caries, it is necessary that these particles be removed and dental floss is the most effective means of accomplishing this. However, the use of dental floss is relatively restricted due partially to the inconvenience of using it and also to the neglect or oversight of the average person.

It is an object of the present invention to provide an improved dental device which greatly simplifies the use of dental floss and which practically eliminates oversight or neglect as a factor in the failure to use dental floss.

My invention contemplates the provision of a combined toothbrush and dental floss applicator of simple and economical construction so formed that a supply or cartridge of dental floss is concealed in a sanitary manner in a receptacle or chamber formed in the handle of the toothbrush in such a manner that a length of the floss may be conveniently removed from the supply and secured around applicator prongs formed at the end of the toothbrush handle. After use the dental floss may be removed from the applicator prongs and discarded without the necessity of handling the used portions. The device forms a convenient reminder in that every time the user brushes his teeth the dental floss is brought to his attention. Furthermore, it minimizes waste in that only a short length of dental floss need be used with the applicator.

For a fuller understanding of the invention reference should be had to the accompanying drawing in which—

Fig. 1 shows a dental device embodying my invention;

Fig. 2 is a side elevation of the device with the handle portion in section showing the dental floss receptacle and dental floss cartridge disposed therein;

Fig. 3 is a sectional view of one end of the handle portion showing the opening for the dental floss receptacle and the closure or plug in open position;

Fig. 4 is a view similar to Fig. 3 with the closure or plug in closed position; and Fig. 5 is a sectional plan view in the direction of the arrows on the line 5—5 of Fig. 4.

In the preferred form of my device my invention is embodied in a toothbrush consisting of the brush portion 10, handle portion 11 in which a dental floss receptacle is formed, and a prong or applicator portion 12 which serves as supporting means for holding a length of dental floss in proper position for use. The toothbrush may be made of any desired type of material such as vulcanized rubber, any of the common plastic material such as pyroxylin, bakelite or the like, or some suitable corrosion resisting metal such as aluminium. The brush or bristle portion 10 which is of the usual convenient size so as to fit in the mouth of the user has bristles 14 secured therein in the usual manner and is connected by means of a restricted throat 15 to the handle portion 11 which is preferably cylindrical in shape and hollow so as to provide a receptacle 16 in which a supply of dental floss 17 may be disposed. The handle 11 and the receptacle 16 formed therein are preferably of such a size as to hold a supply of dental floss that will last for a considerable period of time without replenishment. In the accompanying drawing the supply of dental floss 17 is the conventional spirally wound cylindrical cartridge and the receptacle 16 is illustrated as being of the proper size and shape for receiving the cartridge.

The upper end of the receptacle 16 is open and is preferably internally screw threaded, as indicated at 19, for receiving the plug or closure, as will be later described, and externally is of slightly reduced diameter and is provided with an annular metal band 20 which preferably projects a slight distance above the handle proper, as indicated at 21, thereby providing a cutting edge for use in severing a length of dental floss from the supply contained in the receptacle as will be later explained. Connected to the upper end of the handle portion is the applicator portion 12 which is formed with an externally threaded plug 23 at its lower end adapted to be screwed into the upper end of the receptacle, as shown, and serve as the closure therefor. Immediately above the plug 23 an annular shoulder or abutment 24 is provided which is of sufficient diameter to engage the projecting end 21 of the metal band 20 when the device is in closed or assembled position, as most clearly brought out in Figs. 2 and 4. The plug 23 has an opening or channel 22 extending diagonally therethrough from the lower end communicating with the dental floss receptacle to the upper end just beneath the shoulder 24. The end 30 of the dental floss in the receptacle extends outwardly through the channel and from time to time as a piece of dental floss is desired the desired length may be drawn through the channel.

At its upper end the applicator portion is formed with a pair of bowed or curved prongs 25 which are forked at the ends as indicated at 26, while below the prongs a cleat 27 is secured to or formed integral with the face of the applicator portion as indicated and if desired an opening or hole 28 may be formed through the applicator portion above the cleat 27 to serve as a convenient means for supporting the dental device from a hook or bracket.

In using the dental applicator one end of a length of dental floss 29 is secured around the cleat 27 and is fed upwardly through the notches 26 formed in the prongs 25, the opposite end of the dental floss being thence fed downwardly and secured around the cleat 27. The device is gripped by the handle portion and the dental floss between the two prongs 25 is projected between the teeth. The prongs 25 curve outwardly in a direction away from the cleat 27, as shown most clearly in Fig. 2, thereby facilitating the insertion of the dental floss between the teeth. The brush portion 10, of course, is used in the usual manner.

A supply of dental floss is placed in the receptacle 16 by unscrewing the plug 23 and inserting the cartridge 17 of dental floss in the receptacle. The end 30 of the dental floss is fed upwardly through the open end of the receptacle and through the feed opening 22 and the plug is then inserted in the top of the receptacle. When it is desired to use the dental floss the plug 23 is partially unscrewed and the end 30 of the dental floss is pulled outwardly until the desired length is obtained. The plug 23 is then screwed back into place in the direction of the arrow in Fig. 5 with the end 30 trailing in back of the plug as it is being screwed downwardly in such a manner that substantially one half a turn of dental floss, as indicated at 31 in Fig. 5, will be curved around the plug 23 in the space 34 provided inside the projecting portion 21 of the metal band. As the plug is screwed downwardly the cutting edge 21 of the metal band 20 will sever the dental floss at the point where the trailing end 31 of the dental floss curves outwardly away from the wall of the plug as indicated at 32 in Fig. 5. This leaves a short length of dental floss curved around the plug in the space 34 inside the metal band 20 between the upper end of the handle portion 11 and the shoulder 24. When the plug is unscrewed it turns in a direction opposite to the arrow in Fig. 5 and this tends to feed the end 31 outwardly above the upper end of the metal band 20 so that the end projects outwardly as indicated at 33 in dotted lines in Fig. 5 and thus the end may be conveniently grasped between the fingers of the user and pulled outwardly until the desired length is secured. The length of dental floss which has been severed from the supply is secured at one end around the cleat 27 and fed between the notches 26 of the prongs 25 and then secured at the other end around the cleat 27. To use the dental floss the portion of the dental floss between the two prongs 25, as stated above, is inserted between the teeth of the user.

It will be seen that I have provided a convenient compact and inexpensive dental device which is exceedingly simple to use. It will be seen furthermore that the supply of dental floss is preserved in a sanitary form in the receptacle and that when it is desired to use it, the desired length of dental floss may readily be removed from the supply.

The dental floss applicator is also of improved construction with the result that the dental floss may readily be inserted between the teeth of the user and also the used dental floss may be discarded without the necessity of touching the used portions.

The cleat 27 should preferably taper from its central portion towards its periphery and in this way the dental floss may be more easily wound around it and also it will be held more firmly in position.

It should be understood, of course, that many modifications may be made in the illustrated and described embodiment of my invention. Thus the dental floss applicator and the dental floss receptacle may be formed in a separate unit as well as being used in combination with a toothbrush and also the specific construction of the closure for the receptacle may be modified. Also the toothbrush employed may be of the type which is provided with a replaceable bristle unit so that the bristles may be replaced from time to time.

I claim:

1. A dental device comprising a hollow member open at one end and forming a receptacle for a supply of dental floss, said receptacle being internally screw threaded at the open end, a cylindrical metal collar formed around the outside of the receptacle at the open end and having a cutting edge projecting beyond the end, and a closure for said receptacle including a screw threaded plug cooperable to engage the screw threaded end of the receptacle and having an abutment portion in engagement with the cutting edge when in closed position, said cutting edge and abutment portion being cooperable to sever the dental floss when it is extended therebetween and the closure is tightened.

2. A dental device comprising a hollow member open at one end and forming a receptacle for a supply of dental floss, said receptacle being internally screw threaded at the open end, a cylindrical metal collar formed around the outside of the receptacle at the open end and having a cutting edge projecting beyond the end, and a closure for said receptacle including a screw threaded plug cooperable to engage the screw threaded end of the receptacle and having an abutment portion in engagement with the cutting edge when in closed position, said cutting edge and abutment portion being cooperable to sever the dental floss when it is extended therebetween and the closure is tightened, said closure being formed with a passageway for the dental floss extending from inside the receptacle when the plug is inserted therein to a point a short distance beneath the abutment portion and said cutting edge being spaced a short distance from the plug when the plug is in closed position to provide a space for receiving the end of the dental floss.

3. A dental device comprising a hollow member open at one end and forming a receptacle for a supply of dental floss, said receptacle being internally screw threaded at the open end, a cylindrical metal collar formed around the outside of the receptacle at the open end and having a cutting edge projecting beyond the end, and a closure for said receptacle including a screw threaded plug cooperable to engage the screw threaded end of the receptacle and having an abutment portion in engagement with the cutting edge when in closed position, said cutting edge and abutment portion being cooperable to sever the dental floss when it is extended therebetween and the closure is tightened, said closure being formed with a passageway for the dental floss extending from inside the receptacle when the plug is inserted therein to a point a short distance beneath the abutment portion and said cutting edge being spaced a short distance from the plug when the plug is in closed position to provide a space for receiving the end of the dental floss, and said closure being formed with a pair of notched prongs extending above the plug for receiving a length of dental floss and with a cleat beneath the prongs for holding the length of dental floss between the prongs.

4. A dental floss container formed in the handle of a toothbrush comprising a hollow cylindrical member open at one end forming a receptacle for a supply of dental floss, said hollow member being internally screw threaded at the open end, a cylindrical metal collar formed around the outside of the receptacle at the open end and having a cutting edge projecting beyond the end, and a closure for said receptacle including a screw threaded plug cooperable to engage the screw threaded end of the receptacle and having an abutment portion in engagement with the cutting edge when in closed position, said cutting edge and abutment portion being cooperable to sever the dental floss when it is extended therebetween and the closure is tightened, said closure being formed with a passageway for the dental floss extending from inside the receptacle when the plug is inserted therein to a point a short distance beneath the abutment portion, and said cutting edge being spaced a short distance from the plug when the plug is in closed position to provide a space for receiving the trailing severed end of the dental floss, and said plug and collar being cooperable to eject the trailing severed end of the dental floss when the plug is unscrewed.

CLINTON BEAN.